United States Patent

[11] 3,587,284

[72] Inventor Jerome H. Lemelson
 Metuchen, N.J.
[21] Appl. No. 674,343
[22] Filed Oct. 10, 1967
[45] Patented June 28, 1971
 Continuation-in-part of application Ser. No.
 432,924, Jan. 8, 1965, now Patent No.
 3,346,220, and a continuation-in-part of
 641,101, Feb. 19, 1957, now Patent No.
 3,173,195.

[54] METHOD FOR PRODUCING A COMPOSITE MATERIAL
 5 Claims, 8 Drawing Figs.
[52] U.S. Cl. .................................................. 72/363,
  51/309, 117/5.1, 264/111
[51] Int. Cl. ................................................... B21b 15/00,
  B21b 45/00
[50] Field of Search .................................... 72/184,
  363, 366; 117/5.1, 5.3, 100; 264/110, 111, 112,
  123, 131, 134, 135, 136; 51/309

[56] References Cited
UNITED STATES PATENTS

| | | | |
|---|---|---|---|
| 1,986,985 | 1/1935 | Stuart et al. | 117/5.3 |
| 2,170,361 | 8/1939 | Whitfield | 72/366 |
| 2,740,188 | 4/1956 | Simmons | 29/157.3 |
| 3,109,331 | 11/1963 | Cordray et al. | 72/363 |
| RE22,373 | 9/1943 | Benner et al. | 264/111 |
| 936,389 | 10/1909 | Wadsworth | 264/111 |
| 2,582,231 | 1/1952 | Catallo | 51/309 |

*Primary Examiner*—Lowell A. Larson

ABSTRACT: A method and apparatus for forming composite articles on a continuous basis of a plurality of materials fed together. The technique involves disposing particulate material between two members such as sheets of metal and forcing one sheet against the other such as by feeding the two sheets to the bite of rollers which are operative to compress the sheets and cause the particulate material therebetween to become pressed into the facing surfaces of either or both the two sheets.

The sheets may be thereafter separated with portions of the particulate material mechanically secured to the surface stratum of either or both the sheets depending upon the characteristics of the two materials. The particulate material may be used as frictional or abrasive material per se or further processing of the composite material may result in providing a layer on the surface of the sheet material which layer includes the particulate material.

The two sheets may comprise sheets of metal such as aluminum or other suitable nonferrous metal, or one sheet of a softer material such as aluminum may be compressed by a sheet of a substantially harder material such as steel to force the particulate material into the softer sheet. In another embodiment, one of the two sheets may be substantially softened by reason of its temperature being elevated so as to render same more easily deformable and to permit the particulate material to be forced into the surface stratum thereof for mechanically securing the individual particles thereto.

In another form, the particulate material is heated to a temperature to cause the individual particles to at least partially fuse or weld to either of the sheets between which they are disposed to effect a mechanical and molecular bond between the particulate and sheet materials. Heat fusible material mixed with the particulate material may also be heated during or just prior to the compression of the two sheets together to cause the particles to become bonded or adhered to either or both the sheets when the heat fusible material solidifies after the sheets are driven together.

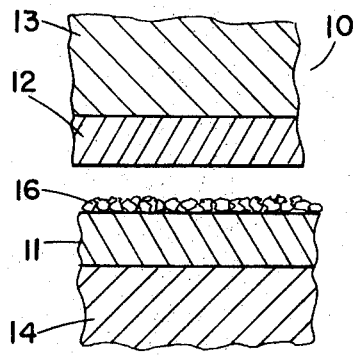
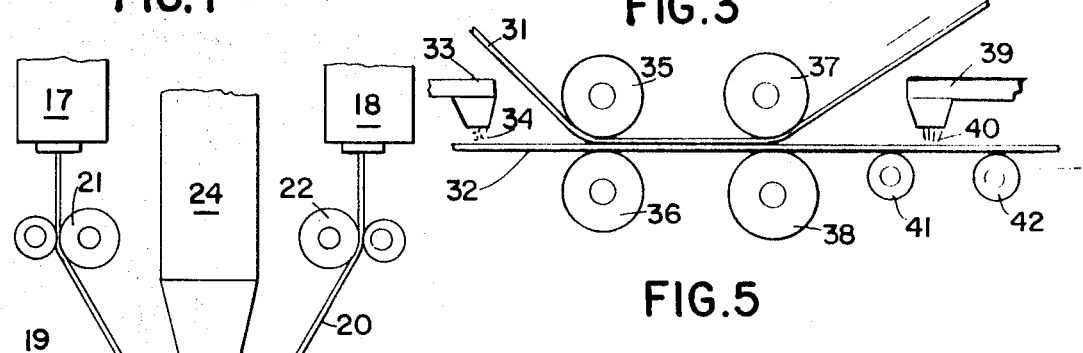
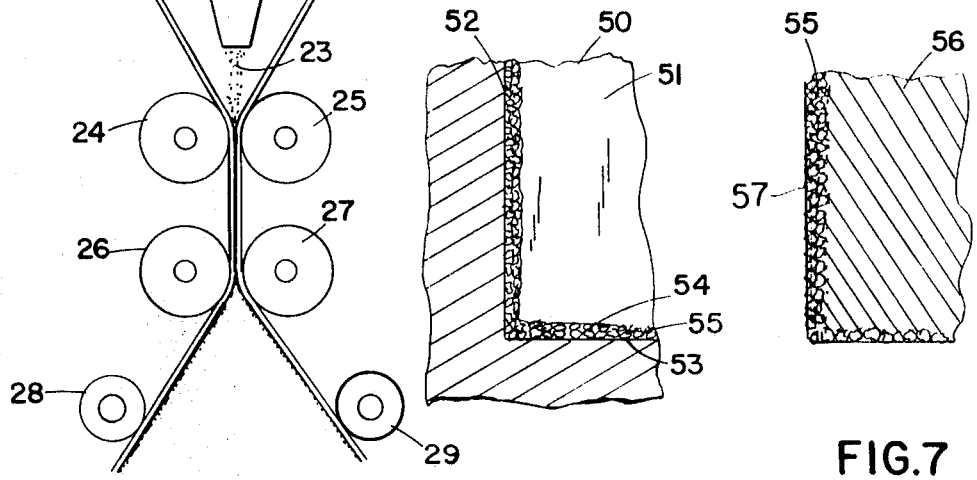
INVENTOR.
JEROME H. LEMELSON
BY

METHOD FOR PRODUCING A COMPOSITE MATERIAL

RELATED APPLICATIONS

This is a continuous-in-part application of Ser. No. 432,924 filed Jan. 8, 1965, now U.S. Pat. No. 3,346,220, and having as a parent application Ser. No. 641,101 filed Feb. 19, 1957, now U.S. Pat. No. 3,173,195, both said applications entitled "-Ducted Panelling and Articles Made thereof."

SUMMARY OF THE INVENTION

This invention relates to an apparatus and method for producing composite articles which are preferably made of metal and ceramic materials. While the invention is primarily concerned with sheets or plates of metal having portions of their outer surfaces defined by a ceramic material formed at least in part of particles, other materials such as sheets made of polymers or ceramic material may also be utilized as components of the composite materials produced by the means defined herein.

It is known in the art to utilize sheet materials such as metal sheet in the fabrication of articles of manufacture which are subject to high-temperature use wherein the material, if not properly processed or protected, will ordinarily corrode or be destroyed by the heat to which they are exposed during use. Various porcelain ceramics, for example, have been fired onto sheet steel to afford a protective coating thereon. However, such coating may chip or otherwise be removed from the metal base during use particularly if extreme temperatures are experienced which cause the metal to rapidly expand and, in so doing, develop faults in the hard porcelain coating. Many modern high-temperature applications of equipment such as reaction vessels and chambers, gas turbine components such as turbine blades, combustion nozzles, control vains, flame holders, gas deflectors and the like are made of metal which, although it exhibits substantial resistance to temperature corrosion and erosion due to the passage of high velocity fluids thereover, nevertheless, rapidly wear or burn out. While such components may be protected by high-temperature ceramic materials by so-called flame-spraying techniques, such means for applying protective coatings suffer a number of shortcomings and are relatively expensive to provide. Not only must a suitably controlled, high-temperature flame be provided to effect the flame spray-coating of metal components, but the control of the feed of material, the combustion process and the relative movement of the spray gun and the component must be precisely controlled and is a difficult operation to perform.

Accordingly, it is a primary object of this invention to provide a new and improved apparatus and method for coating ceramic material onto a metal base member and for forming new and improved articles of manufacture thereof.

Another object is to provide an improved apparatus and method for securing abrasive particulate material to sheet material in a rolling mill without subjecting the rolls of the mill to rapid erosion due to the abrasive material.

Another object is to provide new and improved articles of manufacture composed of metal and particulate ceramic material combined in a manner so as to utilize the characteristics of both materials to advantage.

Another object is to provide an improved metal sheet having a ceramic coating thereon consisting at least in part of ceramic abrasive bits which are mechanically secured within the surface stratum of the sheet defining at least one surface thereof.

Another object is to provide an improved method of producing composite articles containing particulate material embedded in a surface stratum thereof by molding or casting molten metal against a surface such as the surface of the wall of a mold cavity against which is temporarily secured or bonded the particulate material.

Another object is to provide a method for producing composite articles having surfaces defined by particulate material or bits by hot forging said articles in dies containing secured to the die forming surfaces a particulate material to be coated or mechanically secured to the surface of the forged articles.

Another object is to provide an improved apparatus and method for producing abrading material and tools of metal and ceramics.

Another object is to provide an improved apparatus and method for continuously producing composite sheet materials.

With the above and such other objects in view as may hereafter more fully appear, the invention consists of the novel constructions, combinations and arrangements of parts as will more fully be described and illustrated in the accompanying drawings, but it is to be understood that changes, variations and modifications may be resorted to which fall within the scope of the invention as claimed.

In the drawings:

FIG. 1 is a fragmentary view in cross section of portions of an apparatus and materials to be worked thereby to form a composite material made in part of a plurality of abrasive bits;

FIG. 2 is a cross-sectional view of a fragment of composite material fabricated by an apparatus of the type illustrated in FIG. 1;

FIG. 3 is a cross-sectional view of a fragment of a second material made in accordance with apparatus of the type provided in FIG. 1;

FIG. 3' shows another embodiment in section;

FIG. 4 is a end view of part of an apparatus for continuously fabricating composite sheet materials of the type shown in FIGS. 2 and 3;

FIG. 5 is a side view of an apparatus for continuously fabricating composite materials made at least in part of material as defined in FIG. 2.

In accordance with the present invention, a composite article is provided which comprises a base portion or substrate having at least a portion of the surface thereof defined by a multitude of ceramic particles which are embedded within the surface stratum of the base member in a manner to mechanically secure or lock said particles to the material of the base member. Such embedding of particles within the surface stratum of the base member is effected by forcing said particles into the base member preferably by passing the base member through a rolling mill without permitting the particles to engage the rolls of the mill which abrade said rolls and wear them out or change their shape so as to render them ineffective for the desired purposes. Means are provided for disposing particulate material between the facing surfaces of two members having outer surfaces which are engaged by the rolls of the rolling mill to effect the desired embedding action.

There is shown in FIG. 1 components of an apparatus which is operative for providing a composite article in accordance with the teachings of the current invention. The apparatus which is operative for providing a composite article in accordance with the teachings of the current invention. The apparatus 10 includes compression members 13 and 14 which may comprise opposed rollers of a first stage of a rolling mill or a press operative to respectively engage members 11 and 12 which may comprise metal sheets and to force said members into engagement with each other after a multitude of abrasive bits 16 are disposed against the outer surface of the sheet 15. The members 13 and 14 are preferably power driven to compress sheets 11 and 12 together so as to force the ceramic or abrasive particles 16 into the surface stratum of at least one of the two sheets for mechanically securing said particles thereto. In FIG. 2, members 11 and 12 are made of material of substantially the same degree of hardness of penetrability and the abrasive members 16 are shown penetrating both members 11 and 12 in a manner to either lock said members together to form a composite assembly thereof or to become embedded in either of the two members 11 and 12 in a random manner so that, when the members 11 and 12 are separated, particles 16 will be secured to each in a more or less uniform array throughout the surface strata of the facing portions of said members.

In FIG. 3, the upper member 11h is preferably a material which is substantially harder than the lower member 12s so that when the two are compressed together with abrasive particles disposed against the upper surface of 12s, the particles will be worked into the surface stratum of member 12s as illustrated. The member 11h may comprise, for example, a sheet or plate of a relatively hard metal such as steel while the member 12s may comprise a relatively softer metal than the metal comprising member 11h such as aluminum or other suitable nonferrous metal. Accordingly, the abrasive bits 16 are forced into the softer metal 12s as illustrated by the harder metal member 11h. In another form, it is noted that members 11h and 12s may comprise the same material or different materials with the member 12s being substantially softened to facilitate penetration by the particles 16 as the result of heating same to a temperature to render the lower member capable of being more easily penetrated by the particles 16 when the two members 11h and 12s are compressed together.

As stated, members 13 and 14 of FIG. 1 may comprise parts of a compression press or opposed and cooperating rolls of a rolling mill. In FIG. 4 is shown means for producing composite materials of the types shown in FIGS. 2 and 3 by continuously feeding two sheets to the bite of a rolling mill and disposing abrasive particles therebetween in the proper density. Extruders 17 and 18 or suitable roll forming means are provided for continuously forming respective materials to a desired shape such as sheets 19 and 20 which are guided from the extruders 17 and 18 by respective rollers 21 and 22 from which said sheets converge to the bite of a rolling mill which includes pairs of powered rollers designated 24, 25 and 26, 27.

Disposed between sheets 19 and 20 at a location before they converge between the rolls 24 and 25 is a dispensing device 23 which is operative to continuously flow a sheetlike stream 23 of abrasive particles at a flow rate such that the desired number of particles are compressed between the sheets and are forced to penetrate the surface strata of either or both sheets during the passage of said sheets between the rolls of the rolling mill. In other words, the particles are distributed in such a manner by the dispensing means 23 that they are provided in the desired density or distribution between the sheets and are mechanically forced into either or both of the sheets surface strata to provide either of the structures illustrated in FIG. 2 or 3.

Located downstream of the rollers 26 and 27 are respective guide rolls 28 and 29 against which the sheets are driven after separating from each other as illustrated in the drawing.

Either or both the composite sheets 19' and 20' of FIG. 4 may thereafter be further processed by fusing the exposed portions of the particles embedded as described or by fusing a further material thereagainst to provide a ceramic coating on the base sheets which coating is at least partially held against the base sheets by the mechanical locking of the particles which have been compressed into said sheets in the rolling mill.

In FIG. 5 is shown a modified form of the apparatus of FIG. 4 wherein particulate material 34 is fed onto the upper surface of one of the two sheets 31 and 32 by means of a dispensing device 33 prior to entry of said sheet into the rolling mill and into abutment with the sheet 31 which serves to force the particles fed by device 33 into the surface stratum of either or both the sheets. From the last rollers 37 and 38 of the rolling mill, the sheets 31 and 32 are separated as illustrated and a further apparatus is provided downstream of the rollers 37 for dispensing a further ceramic material, binder or other coating material against the upper surface of sheet 34 which contains particles embedded therein as described.

Device 39 may comprise a spreader for particles, spray means or coating means for providing suitable material against the upper surface of sheet 32 and operative to encapsulate the particles forced into said upper surface as described. Device 39 may also comprise heating means such as a plasma gun or other heat applying means for fusing the particles and/or other material applied to the upper surface of sheet 32 to form a uniform layer or coating thereon backed up by said particles: Various ceramic or cermet materials as described in my said copending application may be applied by the means 39 or supplemental equipment located downstream of the rolling mill for operating on either or both the separated sheets.

Composite material of the type described may be produced in other than sheet or plate form by casting or forging hot molten or heat softened metal against the surface of a die or mold which has been coated with particles of the type described and preferably held thereagainst in a suitable binding material. FIG. 6 illustrates a portion of a casting or injection mold 50 in cross section and having a mold cavity 51 in which molten metal or other material is cast or otherwise molded to shape. At least part of the sidewalls 52 and bottom wall 53 of the molding cavity are shown coated with particles of the types described and defined by notation 54 which particles are held against the surfaces of the mold walls in a binder 55 which may comprise a suitable plastic resin, bone ash in water or other suitable binding material serving to cement the bits to the wall of the mold. While a suitable plastic resin applied to the mold wall surfaces or premixed with the bits 54 will burn off when molten metal is flowed into the mold, various known ceramic cements may also be utilized which contain finely divided ceramic materials which form part of the surface layer or matrix including the abrasive bits on the surface of the molded article. The molded article 56 shown in FIG. 7 may thus have one or more layers of abrasive bits 55 and powdered material as described interspersed with metal of the base defining the outer layer or surface stratum of the molding.

The article shown in FIG. 7 may also be formed by injection molding metal or other suitable material in the mold shown or by forging metal or other material in a soft condition against the surfaces of a die containing held thereagainst or disposed by gravity said particulate material which becomes worked into the surface of the forging during the forging action.

Member 50 may also comprise a sheet of metal on which sheet particles are disposed and against which particles a material is cast to encapsulate said particles as described.

I claim:

1. A method of forming an abrasive tool by molding comprising:

disposing and retaining a plurality of abrasive particles against cojoining portions of the walls of a mold cavity which wall portions are angulated with respect to each other, admitting a molten molding material into said mold cavity and causing said molten material to flow over and around at least a portion of each of the particles disposed against said mold cavity wall, solidifying said molding material in said mold cavity to form a solid body shaped with cojoining, angulated surfaces and containing said particles integrally secured in the surface strata of said cojoining surfaces; and removing said solid body from said mold cavity providing a multifaceted abrasive tool thereof.

2. A method of forming a composite material comprising:

disposing a plurality of abrasive particles between first and second sheet materials at least one of which sheet materials comprises a sheet of metal, feeding the two sheets between rolls and causing said rolls to compress said sheets together with sufficient force to cause said particles to penetrate the surface of at least one of said sheets in a manner to retain and encapsulate at least a portion of each of said particles within the surface stratum of the sheet penetrated by said particles.

3. A method in accordance with claim 2 whereby one of said sheets is a metal such as aluminum into which the particles are compressed when the two sheets are passed through said rolls.

4. A method in accordance with claim 2 whereby both of said sheets are made of aluminum and said particles are forced to penetrate the surface strata of both said sheets.

5. A method in accordance with claim 2 whereby one of said sheets is softened by heat when passed between said rolls to facilitate the penetration of the surface stratum thereof by said particles.